US012606487B2

(12) United States Patent
Ge et al.

(10) Patent No.: US 12,606,487 B2
(45) Date of Patent: Apr. 21, 2026

(54) METHOD FOR PREPARING CONCRETE BASED ON GGBS, SILICON-ALUMINUM COMPOUNDS AND $CO_2$ WASTE GAS

(71) Applicant: SHANDONG UNIVERSITY, Jinan (CN)

(72) Inventors: Zhi Ge, Jinan (CN); Haomeng Song, Jinan (CN); Hongzhi Zhang, Jinan (CN); Shuai Song, Jinan (CN); Xingjie Xue, Jinan (CN); Hanming Zhang, Jinan (CN); Jingjing Lv, Jinan (CN); Yujie Feng, Jinan (CN); Ke Sun, Jinan (CN); Shengya Zhou, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 18/972,630

(22) Filed: Dec. 6, 2024

(65) Prior Publication Data

US 2025/0230100 A1 Jul. 17, 2025

(30) Foreign Application Priority Data

Jan. 12, 2024 (CN) ......................... 202410047464.1

(51) Int. Cl.
*C04B 28/08* (2006.01)
*C04B 14/10* (2006.01)
(Continued)

(52) U.S. Cl.
CPC ............ *C04B 28/08* (2013.01); *C04B 14/106* (2013.01); *C04B 18/08* (2013.01);
(Continued)

(58) Field of Classification Search
CPC ....... C04B 28/08; C04B 14/106; C04B 18/08; C04B 40/0046; C04B 40/0067;
(Continued)

(56) References Cited

U.S. PATENT DOCUMENTS

2011/0277670 A1* 11/2011 Self ......................... C04B 28/02 210/768
2022/0143571 A1* 5/2022 Li ........................... C02F 1/281

FOREIGN PATENT DOCUMENTS

CN 114426419 A 5/2022
CN 116283141 A 6/2023
(Continued)

OTHER PUBLICATIONS

Experimental Study on Carbonation Durabiliyt of Kaolin Strengthened With Slag Portland Cement by Want, Ma Wang Shi You Tian Liu Hu Song Wang Sun Yang Sun Materials 2022 15 1240 (Year: 2022).*

(Continued)

*Primary Examiner* — Pamela H Weiss
(74) *Attorney, Agent, or Firm* — CBM PATENT CONSULTING, LLC

(57) ABSTRACT

A method for preparing concrete based on GGBS, silicon-aluminum compounds and $CO_2$ waste gas includes: putting a certain quantity of GGBS, silicon-aluminum compounds and water into a ball milling tank; introducing $CO_2$ waste gas into the tank, and stopping the introduction when gas pressure in the tank reaches a standard; and starting the ball milling tank, and repeating the gas charging and ball milling for multiple times until a median size reaches the standard and $CO_2$ is completely reacted and adsorbed by the GGBS, and finally preparing concrete from a GGBS mixture meeting requirements. According to the method, by adding the silicon-aluminum compounds into the GGBS, and under a mechanical action of the ball milling machine, the GGBS is promoted to react with and adsorb $CO_2$.

7 Claims, 2 Drawing Sheets

(51) Int. Cl.

| | |
|---|---|
| ***C04B 18/08*** | (2006.01) |
| ***C04B 40/00*** | (2006.01) |
| ***C04B 40/02*** | (2006.01) |
| ***C04B 103/00*** | (2006.01) |
| ***C04B 111/00*** | (2006.01) |

(52) U.S. Cl.
CPC ...... *C04B 40/0046* (2013.01); *C04B 40/0067* (2013.01); *C04B 40/0082* (2013.01); *C04B 40/0231* (2013.01); *C04B 40/0281* (2013.01); *C04B 2103/0078* (2013.01); *C04B 2111/00017* (2013.01)

(58) Field of Classification Search
CPC ............ C04B 40/0082; C04B 40/0231; C04B 40/0281; C04B 2103/0078; C04B 2111/00017; C04B 28/04; C04B 20/0232; C04B 2111/00019; C04B 7/153; C04B 22/10; C04B 2111/20; C04B 2201/50; C04B 14/048; C04B 14/06; C04B 18/141; B02C 17/10; B02C 2201/06
See application file for complete search history.

(56) References Cited

FOREIGN PATENT DOCUMENTS

| | | | |
|---|---|---|---|
| KR | 20120063280 | A | 6/2012 |
| WO | 2020102724 | A1 | 5/2020 |

OTHER PUBLICATIONS

Feasibility Study of Synergistic Use of Sludge and Coal Based Solid Waste to Product Environmentally Friendly Grouting Materials W Zhang S Li J Ma D Huang L Zhang C Ma Acs Omega 2023 8 45854-45866 (Year: 2023).*
CN109987903A Machine Translation (Year: 2019).*
JP 2015202978A Machine Translation (Year: 2015).*

* cited by examiner

METHOD FOR PREPARING CONCRETE BASED ON GGBS, SILICON-ALUMINUM COMPOUNDS AND $CO_2$ WASTE GAS

CROSS-REFERENCE TO RELATED APPLICATIONS

This application claims priority to Chinese Patent Application Ser. No. CN2024100474641 filed on 12 Jan. 2024.

FIELD OF THE INVENTION

The present disclosure relates to a method for preparing concrete based on ground-granulated blast-furnace slag (GGBS), silicon-aluminum compounds and $CO_2$ waste gas, which belongs to the field of green concrete.

BACKGROUND OF THE INVENTION

Cement serves a variety of purposes, the most important of which is as a cementing material in concrete. The cement accounts for about 12% of a weight of concrete. The global annual consumption of cement is up to billions of tons. Among various types of cement, Portland cement is the most popular. However, cement production is a pollution activity, contributing to about 5% of global carbon dioxide emissions. In China, cement production and consumption account for more than half of the global total, with carbon dioxide emissions from cement production constituting up to 12% of China's total emissions. Approximately 77% of greenhouse gases in the air are carbon dioxide, and the increase in carbon dioxide concentration is a main cause for global warming. Global warming is a critical factor influencing the social and ecological environment of the earth, leading to problems such as rising sea level and temperature, acidification of oceans, and reduction of global ice thicknesses.

GGBS is a kind of industrial solid waste that is produced in large quantities and is relatively inexpensive. Its production process may not release significant amounts of carbon dioxide. Replacing part of cement with the GGBS is an effective method to reduce carbon emission in the concrete production. However, practical engineering application has encountered challenges, such as high drying shrinkage and low early strength. These problems can be solved by adding activators Sodium hydroxide and sodium silicate are commonly used and effective GGBS activators. However, these two activators are not naturally occurring and require substantial energy to produce. Sequestration of carbon dioxide is also an important way to reduce the concentration of carbon dioxide. Through carbonation reaction, carbon dioxide may be permanently sequestrated by combining with minerals, and carbonation products may play a role of activation in GGBS hydration. It is hopeful that carbon mineralization products of the GGBS can be used as substitutes for unnatural GGBS activators such as sodium hydroxide and sodium silicate. However, current methods for sequestrating the carbon dioxide with the GGBS face limitations, including low carbon dioxide sequestration capacity, and fail to address the issues of high drying shrinkage and low early strength in the slag concrete.

SUMMARY OF THE INVENTION

In order to overcome defects in the prior art, the present disclosure provides a method for preparing concrete based on GGBS, silicon-aluminum compounds and $CO_2$ waste gas, which promotes the combination and adsorption of $CO_2$ by the GGBS under mechanical action of a ball milling machine on the GGBS and by adding the silicon-aluminum compounds, thereby improving a $CO_2$ sequestration rate of the GGBS, and having a significant activation effect on GGBS hydration. In a ball milling process, a part of $CO_2$ is dissolved in water to generate carbonate ions that are combined with active alkaline-earth metallic oxide in the GGBS to generate carbonates, and the remaining $CO_2$ is adsorbed into a GGBS mixture to participate in reactions during concrete hydration, so that the early strength of the slag concrete is improved, and drying shrinkage slump losses of the slag concrete are reduced. The prepared slag concrete has characteristics of good workability, good durability and environmental protection.

The present disclosure adopts the following technical solutions:

A method for preparing concrete based on GGBS, silicon-aluminum compounds and $CO_2$ waste gas includes the following steps:

(1) weighing a certain quantity of GGBS, silicon-aluminum compounds and distilled water, premixing in a mixer, and putting into a ball milling tank with aluminum oxide as a ball milling medium;

(2) introducing, by using an inflator pump, $CO_2$ waste gas into the ball milling tank, and turning off the inflator pump when gas pressure in the tank reaches a standard;

(3) starting a ball milling machine, milling at a speed of 400-600 rpm for 10 to 20 min, then standing still, repeating operations in step (2), continuing the milling, and repeating the operations for multiple times until $CO_2$ waste gas with a specified mass M is introduced and reacted or adsorbed completely by the GGBS mixture, when the $CO_2$ waste gas introduced at the last time is not enough to enable the gas pressure in the tank to reach the standard, filling the tank with nitrogen until the gas pressure in the tank reaches the standard, and controlling, by using an industrial air cooling machine, a temperature of the ball milling tank to be 20±2° C. throughout the process, where a feeding port of the ball milling tank is provided with an inlet valve, the inlet valve is connected with the inflator pump, a discharging port is provided with an outlet valve and a pressure gauge, the inlet valve and the outlet valve are used to control the introduction and discharging of the $CO_2$ waste gas, the pressure in the tank is measured by the pressure gauge to judge whether $CO_2$ in the tank is charged fully and reacted completely, and before introducing the $CO_2$ waste gas, nitrogen is introduced for 10 min to exhaust the air in the tank;

(4) measuring, by a laser particle size analysis method, a median size of the mixture of GGBS and silicon-aluminum compounds, if the median size cannot meet the requirement, continuing the ball milling in nitrogen until the required mixture of GGBS and silicon-aluminum compounds is obtained. The mixture of GGBS and silicon-aluminum compounds, Portland cement, coarse and fine aggregate are used together to prepare the slag concrete. In a milling process, a part of $CO_2$ is dissolved in water and reacts with calcium and magnesium ions in the mixture to generate carbonates, the other part is adsorbed physically by the GGBS mixture into pores, by adding the silicon-aluminum compounds, the porosity of the mixture is increased, so that more $CO_2$ can be adsorbed, and the mechanical action of the ball milling machine on the GGBS mixture can promote the adsorption of $CO_2$ by the GGBS, which increases the mass of the adsorbed $CO_2$, and improves the hydration activity of the GGBS; and in the milling process, a part of $CO_2$ is dissolved in water and reacts with calcium and magnesium ions in the GGBS mixture to generate carbonates, the other part is adsorbed physically by the GGBS mixture into the pores, by adding the silicon-aluminum compounds, the porosity of the mixture is increased, so that more $CO_2$ can be adsorbed, and the mechanical action of the ball milling machine on the GGBS mixture can promote the adsorption of $CO_2$ by the GGBS, which increases the mass of the adsorbed $CO_2$, and improves the hydration activity of the GGBS;

(5) mixing the mixture of GGBS and silicon-aluminum compounds obtained in step (4) with Portland cement to obtain a GGBS-cement mixture, adding water according to a mass ratio of water to GGBS-cement mixture of (0.35-0.41):1, and mixing with a certain quantity of coarse and fine aggregate to prepare slag concrete, where coarse aggregate adopts granite with a maximal particle size of 7-9 mm, the fine aggregate adopts natural sand, a fineness modulus of a mixture of coarse and fine aggregate is 4.0-4.5, in a hydration process of the slag concrete, $CO_2$ adsorbed in step (3) may have a beneficial carbonation reaction to promote the hydration, active silicon dioxide and aluminum oxide in the silicon-aluminum compounds react with calcium hydroxide released by the cement hydration to generate stable calcium silicate hydrate (CSH) gel and hydrated calcium aluminate, and since the calcium hydroxide is consumed, the hydration of the cement may also be promoted; and (6) pouring the slag concrete obtained in step (5) into a mold, vibrating for 3 min to compact, sealing the mold, curing for 24 h at a temperature of 22+2° C. and a relative humidity greater than or equal to 90%, demoulding, and curing in a standard environment to a specified age.

A principle of the present disclosure is as follows:

The GGBS, the water and the silicon-aluminum compounds are subjected to mechanical ball milling in the $CO_2$ waste gas, a part of $CO_2$ is dissolved in water and reacts with calcium and magnesium in a mixture of GGBS and silicon-aluminum compounds to generate carbonates; and a part of $CO_2$ enters the pores of the GGBS mixture and is physically adsorbed onto the particles. At the beginning of the ball milling process, the particle size of the GGBS mixture (i.e. the mixture of GGBS and silicon-aluminum compounds) may be reduced until the median size meets the requirement; however, with further proceeding of the ball milling, input energy may be changed into the mechanical action to promote the GGBS mixture to adsorb $CO_2$.

$CO_2$ is dissolved in water and reacts with the calcium and magnesium in the GGBS mixture to generate the carbonates, and the carbonates may play a good role in filling and nucleating, and can also be used as an activator for hydration of the GGBS mixture. The carbonation reaction is generally as follows: in an environment of $CO_2$ waste gas, at a state of normal temperature and high pressure, the active alkaline-earth metallic oxides (CaO and MgO) in the GGBS are dissolved, and hydrolyzed in a water medium to release hydroxyl ions, so that a pH value of the mixture increases, and the mixture shows high alkalinity, thereby having strong capacity for capturing and sequestrating $CO_2$; and $CO_2$ is dissolved in water to generate carbonic acid that reacts rapidly with hydroxyl ions and calcium and magnesium ions in the mixture, which leads to the decrease of pH value of the mixture and generates the carbonates. A reaction formula is as follows:

$$CaO + H_2O = Ca(OH)_2$$

$$Ca(OH)_2 = Ca^{2+} + 2OH^-$$

$$CO_2 + H_2O \rightleftharpoons H_2CO_3$$

$$H_2CO_3 \rightleftharpoons H^+ + HCO_3^-$$

$$CO_2 + OH^- \rightleftharpoons HCO_3^-$$

$$HCO_{3-} \rightleftharpoons CO_3^{2-} + H^+$$

$$Ca^{2+} + HCO_3^- = CaCO_3 + H^+$$

$$Ca^{2+} + CO_3^{2-} \xrightarrow{H_2O} CaCO_3$$

$$MgO + H_2O = Mg(OH)_2$$

$$Mg(OH)_2 = Mg^{2+} + 2OH^-$$

$$CO_2 + H_2O \rightleftharpoons H_2CO_3$$

$$H_2CO_3 \rightleftharpoons H^+ + HCO_3^-$$

$$CO_2 + OH^- \rightleftharpoons HCO_3^-$$

$$HCO_3^- \rightleftharpoons CO_3^{2-} + H^+$$

$$Mg^{2+} + HCO_3^- = MgCO_3 + H^+$$

$$Mg^{2+} + CO_3^{2-} \xrightarrow{H_2O} MgCO_3$$

In a mechanical milling process, after $CO_2$ reacts completely with the active alkaline-earth metallic oxides (CaO and MgO) in the GGBS mixture, surfaces of mixture particles can still adsorb a part of $CO_2$, and the mass of the adsorbed $CO_2$ is related to the porosity of the mixture. The particle size of metakaolin is between 2 μm and 10 μm, the particle is shaped like a thin curve tube, so that the specific surface area is relatively large. The porosity is closely related to the specific surface area, and a large porosity enhances $CO_2$ adsorption. Fly ash particles are of a porous cellular structure with large specific surface area and high adsorption activity, and the particle size is ranged from 0.5 μm to 300 μm. The fly ash particles have a porous structure, and the porosity can be up to 50%. To sum up, the silicon-aluminum compounds such as the metakaolin, the fly ash and the like have characteristics of large specific surface area, high porosity, high adsorption activity and the like compared with the GGBS; and by adding the silicon-aluminum compounds such as the metakaolin, the fly ash and the like into the GGBS, the porosity of the mixture can be increased, and the mass of $CO_2$ adsorbed by the GGBS mixture can be increased.

In a hydration process of slag concrete, the adsorbed $CO_2$ may react with other minerals except tetracalcium aluminoferrite (C4AF) to generate trigonal calcite and orthorhombic aragonite with extremely high stability. At an initial stage of hydration, tricalcium silicate (C3S) reacts with $CO_2$ in liquid phase to generate C—S—H and $CaCO_3$. With the further hydration, C—S—H begins to react with $CO_2$ and is decalcified to generate amorphous silica gel ($SiO_2 \cdot nH_2O$) which fills the pores to improve the early strength of the slag concrete. Specific reaction processes are as follows:

$$3(3CaO \cdot SiO_2)+(3-x)CO_2+nH_2O \rightarrow xCaO \cdot SiO_2 \cdot nH_2O+(3-x)CaCO_3$$

$$2(2CaO \cdot SiO_2)+(2-x)CO_2+nH_2O \rightarrow xCaO \cdot SiO_2 \cdot nH_2O+(2-x)CaCO_3$$

$$xCaO \cdot SiO_2 \cdot nH_2O+xCO_2 \rightarrow SiO_2 \cdot nH_2O+CaCO_3$$

Active silicon dioxide and aluminum oxide in the silicon-aluminum compounds react with calcium hydroxide released by the hydration to generate stable CSH gel and hydrated calcium aluminate. Since the calcium hydroxide is consumed, the hydration may also be further promoted. In the ball milling process, carbonates generated by carbonation inhibits the transformation of ettringite into monosulfate hydrate (AFM) during the hydration, thereby stabilizing the entringite (AFT). A molar volume of ettringite is larger than that of monosulfate hydrate, so the stabilization increases the solid volume of hydration products. At the same time, carbonates provide a nucleating site for the precipitation of hydration products, accelerates the hydration process, and improves the conversion rate of hydration. Because of small particle size, the carbonates may fill voids among the cement particles, so that the cement particles are packed densely, the pore structure is thinned, and the strength becomes higher. The tiny carbonate particles fill the pores that are originally occupied by water, so that more water can be used to lubricate the particles, the slump loss can be reduced, and the workability of the slag concrete is better.

Preferably, in the reaction, the mass of $CO_2$ reacting with calcium and magnesium to generate the carbonates is mainly related to the mass of calcium oxide and magnesium oxide in the mixture of the GGBS and the silicon-aluminum compounds, and the mass of the adsorbed $CO_2$ is mainly related to the porosity of the GGBS after being mixed with the silicon-aluminum compounds. In step (1), when the mass of GGBS is known, the mass of the silicon-aluminum compounds added into the ball milling tank is calculated according to the following formula:

$$m_{SA} = \frac{SSA_{SA}}{SSA_S} \times \omega \times (m_S - m_{CaO} - m_{MgO}),$$

in the formula, $m_{SA}$ is the mass of silicon-aluminum compounds; $SSA_{SA}$ and $SSA_S$ are specific surface areas (that may be determined by a low-temperature nitrogen adsorption method) of the silicon-aluminum compounds and the GGBS, respectively; w is an empirical coefficient inferred according to an influence degree of a porosity of silicon-aluminum compounds on the carbon mineralization efficiency of the GGBS, and a value range is 0.843-0.951; ms is the mass of GGBS; $m_{CaO}$ is a total mass of calcium oxide in the mixture of GGBS and silicon-aluminum compounds; and $m_{MgO}$ is a total mass of magnesium oxide in the mixture of GGBS and silicon-aluminum compounds.

According to the present disclosure, by controlling the adding amount of silicon-aluminum compounds, and parameters such as pressure, time and temperature during the ball milling, a mass ratio of the reacted $CO_2$ to the adsorbed $CO_2$ is about 4.0 to 2.5, so that the carbonate generated in the milling and the adsorbed $CO_2$ can play an optimal activation role in the hydration of GGBS and cement.

Preferably, a ratio of the mass of distilled water added in step (1) to the total mass of the GGBS and the silicon-aluminum compounds is 0.1:1.

Preferably, the silicon-aluminum compounds are a construction material rich in $SiO_2$ and $Al_2O_3$, and include but are not limited to metakaolin, fly ash and a mixture of the two.

Preferably, in step (2), when the pressure reaches 190-210 kPa, preferably 200 kPa, the gas pressure in the tank is considered to reach the standard.

Preferably, in step (3), the ball milling machine mills at a speed of 500 rpm for 15 min, and then stands still for 10 min.

Preferably, in step (4), the median size of the mixture of GGBS and silicon-aluminum compounds is required to be 8.8-9.2 micrometers.

When the particle size of the carbonate is greater than that of the GGBS mixture, the hydration products per unit volume of the slag concrete are reduced, which shows a diluting effect, and may reduce the mechanical properties and durability of the slag concrete. According to the present disclosure, during the ball milling, by controlling the milling speed, the pressure, the temperature and the time, the fineness of carbonate generated by carbonation is in a nano-scale, and the carbonate with the particle size greater than that of the GGBS mixture may not be generated, which may not produce an adverse effect on the particle size distribution of the GGBS mixture and the properties of the slag concrete.

Preferably, the total mass of the introduced $CO_2$ during the ball milling is related to the content of calcium and magnesium oxides in the GGBS and the porosity of the silicon-aluminum compounds. When excessive $CO_2$ waste gas is introduced, the carbonation of the GGBS mixture may generate excessive carbonates, so that an average pore size of the GGBS mixture is reduced, the capacity of the GGBS mixture for adsorbing $CO_2$ is weakened, and the hydration activity of the GGBS and the freezing resistance of the prepared slag concrete are reduced. By controlling the total mass of the introduced $CO_2$, the carbonation reaction is ensured to generate a proper amount of carbonate, and the total mass $m_{CO_2}$ of $CO_2$ required to be reacted and adsorbed by the mixture of GGBS and silicon-aluminum compounds is as follows:

$$m_{CO_2} = \left(\frac{m_{CaO}}{M_{CaO}} + \frac{m_{MgO}}{M_{MgO}}\right) \times M_{CO_2} \times \mu \times \left(1 + \frac{m_{SA}}{m_{SA} + m_S}\right) \times \delta,$$

in the formula, $M_{CaO}$, $M_{MgO}$ and $M_{CO_2}$ represent molar masses of calcium oxide, magnesium oxide and carbon dioxide, respectively; μ is an empirical coefficient inferred according to the activity of the alkaline-earth metallic oxides in the material, and a value range is 0.45-0.65; and δ is a coefficient related to the porosity of the added silicon-aluminum compounds, and a value range is 1.1-1.4.

$CO_2$ waste gas includes one or more of $CO_2$-containing industrial waste gases emitted from coal-fired power plants, or a combination of, and iron and steel production, and according to the total mass $m_{CO_2}$ of $CO_2$ required to be reacted and adsorbed by the mixture of GGBS and silicon-aluminum compounds, a required mass M of the waste gas introduced into the tank is calculated by the following formula:

$$m_{CO_2} = \frac{xN}{1.112} + 0.718(M - x),$$

-continued $$M = \sum m_n K_n,$$

in the formula, x is the mass of the industrial waste gas with the highest $CO_2$ content in the $CO_2$ waste gas; N indicates a proportion of $CO_2$ in the industrial waste gas with the highest $CO_2$ content in the $CO_2$ waste gas; xN/1.112 indicates the mass of $CO_2$ in the industrial waste gas with the highest $CO_2$ content in the $CO_2$ waste gas; 1.112 is an empirical coefficient inferred according to the $CO_2$ content in the industrial waste gas with the highest $CO_2$ content in the $CO_2$ waste gas; M is the mass of the waste gas introduced into the tank and also the total mass of all industrial waste gases in the $CO_2$ waste gas; and 0.718 ($M-\chi$) is a sum of $CO_2$ content of other industrial waste gases in the $CO_2$ waste gas, and 0.718 is an empirical coefficient inferred according to the proportion sum of the $CO_2$ content of other industrial waste gases in the $CO_2$ waste gas; $m_n$ is the separate mass of each industrial waste gas, and $K_n$ is a proportion of $CO_2$ in each industrial waste gas.

Since the $CO_2$ waste gas contains various industrial waste gases, and the $CO_2$ content in different types of industrial waste gases is different, the utilization efficiency in carbon mineralization is also different, and a required mass of various industrial waste gases may be determined by the above formula.

Due to different sources of the $CO_2$ waste gas, the proportion of each component in chemical compositions is sometimes quite different, and the components are complex. The empirical coefficient has a correction effect, which improves the applicability of the formula to various types of $CO_2$ waste gases.

The empirical coefficients 1.112 and 0.718 are obtained through fitting based on the data of $CO_2$ in multiple groups of industrial waste gases using software, which are representative because the empirical coefficients are obtained from extensive data analysis.

Preferably, the milled GGBS mixture contains carbonates and $CO_2$ adsorbed in the pores, and in the hydration process after the GGBS mixture is mixed with the cement, excessive carbonates and $CO_2$ may not improve the hydration activity of the GGBS and cement. In order to achieve optimal activation and hydration effect of the carbonized GGBS mixture, in step (5), the amount of Portland cement is determined according to the mass of the mixture of GGBS and silicon-aluminum compounds:

$$m_c = \frac{m_{CO_2}}{M_{CO_2}} \times M_C \times 0.8 \times \gamma,$$

in the formula, mc is a required mass of Portland cement; Mc indicates a molar mass of the carbonate generated by carbonation; 0.8 is a ratio of the mass of $CO_2$ for carbonation in the GGBS mixture to the total mass of $CO_2$; and $\gamma$ is a parameter related to the efficiency of the carbonate for activating the cement and is valued at 2.72-4.27.

Preferably, the compressive strength of the prepared concrete is tested according to GB-T50081-2019 "Standard for Test Methods of Concrete Physical and Mechanical Properties". The mass of $CO_2$ finally sequestrated in the GGBS mixture is calculated by an acid digestion method. 10% nitric acid solution is used for acid digestion, and a process of the acid digestion method is generally as follows: firstly, recording a weight of an empty beaker with a glass stick, weighing about 40 g of GGBS mixture, putting into the beaker, putting 300 ml of 10% nitric acid solution into another beaker, and recording the weight. Mixing the weighed nitric acid solution with the GGBS mixture, stirring for 10 min with the glass stick (until bubbles disappear), and recording the weight of the mixture in the beaker. A $CO_2$ sequestration rate is calculated by the following formula:

$$CO_2 = \frac{m_1 + m_2 - m_3}{m_1/(1 + w_f)} * 100,$$

in the formula, $m_1$ is the weight (about 40 g) of the weighed GGBS mixture; $m_2$ is the weight (about 300 g) of the nitric acid solution; $m_3$ is the weight of the mixture after being stirred continuously for 10 min; and $w_f$ is a moisture content of the GGBS mixture.

$CO_2$ indicates the $CO_2$ sequestration rate, which is multiplied by the weight of the GGBS mixture to obtain a $CO_2$ sequestration amount; the $CO_2$ sequestration amount is equal to the mass of reacted $CO_2$ plus the mass of adsorbed $CO_2$; and because all reactions have losses, the $CO_2$ sequestration amount is used to calculate or verify the obtained total mass $m_{CO_2}$ of $CO_2$ required for the reaction and adsorption and the reaction loss.

Preferably, the silicon-aluminum compounds are metakaolin, and mass parts of GGBS, metakaolin and distilled water are 27, 3 and 3, respectively; and the mass part of aluminum oxide in the ball milling tank is 50; and when the slag concrete is prepared after the ball milling, 35 parts of Portland cement, 23 parts of water, 99 parts of fine aggregate natural sand, and 147 parts of coarse aggregate granite are used.

Preferably, the silicon-aluminum compounds are fly ash, and the mass parts of GGBS, fly ash and distilled water are 29, 18 and 4.7, respectively; and the mass part of aluminum oxide in the ball milling tank is 50.

When the slag concrete is prepared after the ball milling, 39 parts of Portland cement, 31 parts of water, 140 parts of fine aggregate natural sand, and 200 parts of coarse aggregate granite are used.

Preferably, the silicon-aluminum compounds include metakaolin and fly ash, a ratio of metakaolin to fly ash is 1:1, and the mass parts of GGBS, silicon-aluminum compounds and distilled water are 31, 5 and 3.6, respectively; and the mass part of aluminum oxide in the ball milling tank is 50.

When the slag concrete is prepared after the ball milling, 35 parts of Portland cement, 25 parts of water, 127 parts of fine aggregate natural sand, and 190 parts of coarse aggregate granite are used.

Preferably, the untreated slag concrete without silicon-aluminum compounds includes GGBS and Portland cement, the mass parts of GGBS, silicate cement and water are 30, 35 and 26, the mass part of fine aggregate natural sand is 110, and the mass part of coarse aggregate granite is 160.

GGBS components include 38.47-41.78 wt % of CaO, 35.29-38.53 wt % of $SiO_2$, 6.57-11.85 wt % of MgO, 8.17-11.41 wt % of $Al_2O_3$, 0.20-0.67 wt % of $Fe_2O_3$, 0.18-0.56 wt % of $K_2O$, and 0.45-3.74 wt % of others.

Metakaolin components include 43.84-49.7 wt % of $SiO_2$, 27.58-32.45 wt % of $Al_2O_3$, 7.25-9.78 wt % of $K_2O$, 0.74-2.02 wt % of $Fe_2O_3$, and 7.29-15.47 wt % of others.

Fly ash components include 3.97-8.63 wt % of CaO, 45.20-48.34 wt % of $SiO_2$, 23.71-31.10 wt % of $Al_2O_3$, 2.57-3.97 wt % of $Na_2O$, 0.47-3.17 wt % of MgO, and 4.45-24.42 wt % of others.

According to the present disclosure, a conventional GGBS milling process is used, the silicon-aluminum compounds with high porosity such as metakaolin, fly ash and the like are used as admixtures in ball milling, the $CO_2$ waste gas is introduced into the ball milling tank to capture and sequestrate $CO_2$ in the waste gas, and the beneficial carbonation reaction is used to promote the hydration of the slag concrete. During the ball milling, a part of $CO_2$ is dissolved in water and reacts with calcium and magnesium in the GGBS mixture to generate carbonates, the carbonates may play a good role in filling and nucleating, and may also be used as an activator in the hydration of the slag concrete; and a part of $CO_2$ enters the pores of the mixture and is adsorbed physically on the particles, by adding the silicon-aluminum compounds into the GGBS, the porosity of the mixture can be improved, and the mechanical action of ball milling can synergistically promote the adsorption of the carbon dioxide by the mixture. During the hydration, the adsorbed $CO_2$ may react with minerals except tetracalcium aluminoferrite to generate calcite and aragonite with high thermal stability; and the carbonates provide a nucleating site for the hydration, which accelerates the hydration process, and increases the conversion rate of the hydration; and the carbonates fill voids among the particles, so that the particles are packed densely, the pore structure is thinned, and the strength becomes higher.

It should be noted that equipment used in the present disclosure such as the ball milling machine, the inflator pump, the pressure gauge, and the like may all adopt the commercially available models, which does not influence the implementation of the present disclosure.

For anything that is not detailed in the present disclosure, the existing technologies may be used.

The present disclosure has the following beneficial effects:

1. In the present disclosure, the GGBS is used as a supplementary cementitious material for the concrete, and the silicon-aluminum compounds such as metakaolin, fly ash and the like are used as modified admixtures for GGBS, so that the used raw materials have characteristics of low cost and large reserve. The silicon-aluminum compounds such as the metakaolin, the fly ash and the like have larger specific surface area, and higher porosity and adsorption activity than GGBS, so that adding the silicon-aluminum compounds into the GGBS can improve the porosity of the mixture, and increase the mass of $CO_2$ adsorbed by the mixture.
2. According to the present disclosure, while the ball milling machine is used to reduce the particle size of the GGBS, the mechanical action of ball milling is used to capture $CO_2$ in the industrial waste gas, so that the carbonation of the GGBS and the adsorption of $CO_2$ can be accomplished efficiently and conveniently without increasing a conventional GGBS treatment step.
3. The slag concrete adopts the GGBS to substitute partial cement, which has advantages of less consumption of cement and less carbon emission compared with the ordinary Portland concrete; however, there are problems such as low early strength, large drying shrinkage, etc. According to the present disclosure, by adding the silicon-aluminum compounds such as metakaolin and fly ash into the GGBS, and introducing the $CO_2$ waste gas during the ball milling, the GGBS is carbonated, which can promote the hydration of the slag concrete, increase the conversion rate of the hydration, and increase the mass of the hydration products, thereby improving the early strength of the slag concrete, reducing drying shrinkage slump losses of the slag concrete, and enabling the prepared slag concrete to have characteristics of good workability, good durability, and environmental protection.
4. According to the present disclosure, under the mechanical action of the ball milling, $CO_2$ is captured from the $CO_2$-containing industrial waste gas; the silicon-aluminum compounds with high porosity such as metakaolin, fly ash and the like are used as the admixtures during the ball milling of the GGBS, which can increase the conversion rate of $CO_2$; and $CO_2$ is sequestrated in the slag concrete through the carbonation reaction, so that the industrial waste gas is used, and the concentration of $CO_2$ in the atmosphere is reduced, which helps to slow down the greenhouse effect.

Figure 1:
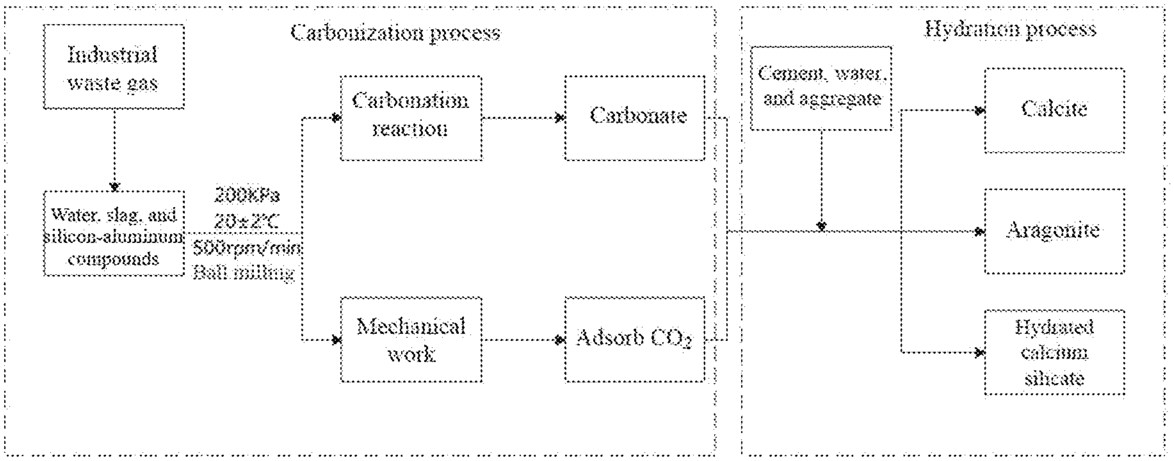
FIG. 1 is a flowchart of the present disclosure.

In the drawings, 1-ball milling tank, 2-inflator pump, 3-pressure gauge, 4-inlet valve, 5-outlet valve, 6-GGBS mixture, 7-temperature detector, 8-gas storage tank, 9-recovery tank, 10-gas delivering pipe, 11-exhaust pipe.

DETAILED DESCRIPTION OF THE EMBODIMENTS

To make to-be-solved technical problems, technical solutions and advantages of the present disclosure clearer, the present disclosure is described in detail below in conjunction with the accompanying drawings and embodiments, but is not limited to this.

Anything that is not detailed in the present disclosure shall follow the conventional technology in the art.

Embodiment 1

Figure 2:
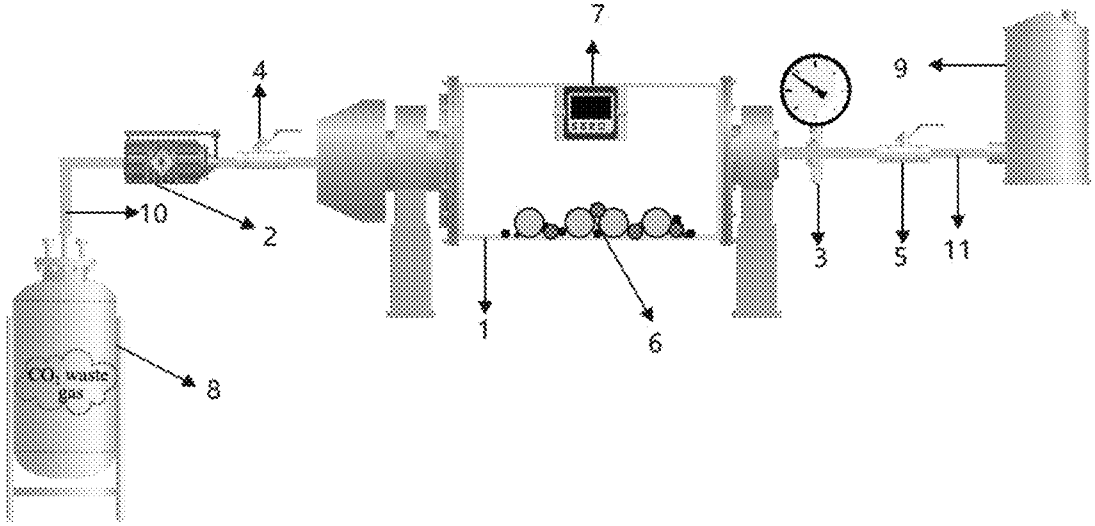
FIG. 2 is a structural schematic diagram of a ball milling tank.

A method for preparing concrete based on GGBS, silicon-aluminum compounds and $CO_2$ waste gas, as shown in FIG. 1 and FIG. 2, includes the following steps:

A certain quantity of GGBS, silicon-aluminum compounds and distilled water is weighed, premixed in a mixer, and put into a ball milling tank 1 with aluminum oxide as a ball milling medium; and the silicon-aluminum compounds are a construction material rich in $SiO_2$ and $Al_2O_3$, and include, but are not limited to metakaolin, fly ash and a mixture of the two.

An inflator pump 2 is used to introduce $CO_2$ waste gas into the ball milling tank 1, and the inflator pump is turned off when gas pressure in the tank reaches a standard; and when a reading of a pressure gauge 3 is 200 kPa, the gas pressure in the tank is considered to reach the standard.

A ball milling machine 1 is started to mill at a speed of 400-600 rpm for 20 min, and then stands still; after operations in step (2) are repeated, the milling is continued, and the process is repeated for multiple times until a specified mass M of $CO_2$ waste gas is introduced and reacted completely or adsorbed by a GGBS mixture; and when the $CO_2$ waste gas introduced at the last time is not enough to make the gas pressure in the tank reach the standard, nitrogen is used to fill the tank until the gas pressure in the tank reaches the standard, and an industrial air cooling machine is used to control a temperature of the ball milling tank to be 20±2° C. throughout the process;

As shown in FIG. 2, a feeding port of the ball milling tank 1 is provided with an inlet valve 4, the inlet valve 4 is connected with an inflator pump 2, and a discharging port is provided with an outlet valve 5 and a pressure gauge 3; the inflator pump 2 is connected with a gas storage tank 8 through a gas delivering pipe 10, and $CO_2$ waste gas is stored in the gas storage tank 8; the outlet valve 5 is connected with a recovery tank 9 through an exhaust pipe 11; the GGBS mixture 6 is stored in the ball milling tank 1; and a temperature detector 7 is arranged in the ball milling machine. In the present disclosure, the inlet valve and the outlet valve are used to control the introduction and discharging of the $CO_2$ waste gas; the pressure in the tank is monitored by the pressure gauge 3 to judge whether $CO_2$ in the tank is full and is reacted completely; and before introducing the $CO_2$ waste gas, nitrogen shall be introduced for 10 min to exhaust the air in the tank.

A laser particle size analysis method is used to measure a median size of a mixture of GGBS and silicon-aluminum compounds, if the median size cannot meet the requirement, the ball milling needs to be continued in nitrogen until the required mixture of GGBS and silicon-aluminum compounds is obtained. The mixture of GGBS and silicon-aluminum compounds, Portland cement, coarse and fine aggregate are used together to prepare slag concrete. In a milling process, a part of $CO_2$ is dissolved in water and reacts with calcium and magnesium ions in the mixture to generate carbonates, and the other part is adsorbed physically by the GGBS into pores. By adding the silicon-aluminum compounds, the porosity of the mixture is increased, so that more $CO_2$ can be adsorbed; and the mechanical action of the ball milling machine on the GGBS mixture can promote the adsorption of $CO_2$ by the GGBS, so that the mass of the adsorbed $CO_2$ is increased, and the hydration activity of the GGBS is improved;

In the milling process, a part of $CO_2$ is dissolved in water and reacts with calcium and magnesium ions in the GGBS mixture to generate carbonates, and the other part is adsorbed physically by the GGBS mixture into the pores. By adding the silicon-aluminum compounds, the porosity of the mixture is increased, so that more $CO_2$ can be adsorbed; and the mechanical action of the ball milling machine on the GGBS mixture can promote the GGBS to adsorb $CO_2$, so that the mass of the adsorbed $CO_2$ is increased, and the hydration activity of the GGBS is improved.

The mixture of GGBS and silicon-aluminum compounds obtained in step (4) is mixed with Portland cement to obtain a GGBS-cement mixture, water is added according to a mass ratio of water to GGBS-cement mixture of (0.35-0.41):1, and then the GGBS-cement mixture is mixed with a certain quantity of coarse and fine aggregate to prepare the slag concrete;

The coarse aggregate adopts granite with a maximal particle size of 7-9 mm, the fine aggregate adopts natural sand, and a fineness modulus of a mixture of coarse and fine aggregate is 4.0-4.5. In the hydration process of the slag concrete, $CO_2$ adsorbed in step (3) may have a beneficial carbonation reaction to promote the hydration; and active silicon dioxide and aluminum oxide in the silicon-aluminum compounds react with calcium hydroxide released by the cement hydration to generate stable CSH gel and hydrated calcium aluminate. Since the calcium hydroxide is consumed, the hydration of the cement may also be promoted.

The slag concrete obtained in step (5) is poured into a mold, and vibrated for 3 min to compact, then the mold is sealed, then curing is performed at a temperature of 22+2° C. and a relative humidity greater than or equal to 90% for 24 h, demoulding is performed, and then the concrete is cured in a standard environment until a specified age is reached.

Embodiment 2

A method for preparing concrete based on GGBS, silicon-aluminum compounds and $CO_2$ waste gas is disclosed. As described in Embodiment 1, in a reaction, the mass of $CO_2$ reacting with calcium and magnesium to generate the carbonate is mainly related to the mass of calcium oxide and magnesium oxide in the mixture of GGBS and silicon-aluminum compounds, and the mass of the adsorbed $CO_2$ is mainly related to the porosity of the GGBS after being mixed with the silicon-aluminum compounds. In step (1), when the mass of the GGBS is known, the mass of the silicon-aluminum compounds added into the ball milling tank is calculated according to the following formula:

$$m_{SA} = \frac{SSA_{SA}}{SSA_S} \times \omega \times (m_S - m_{CaO} - m_{MgO}),$$

in the formula, $m_{SA}$ is the mass of the silicon-aluminum compounds; $SSA_{SA}$ and $SSA_S$ are specific surface areas (that may be determined by a low-temperature nitrogen adsorption method) of the silicon-aluminum compounds and the GGBS, respectively; ω is an empirical coefficient inferred according to an influence degree of a porosity of the silicon-aluminum compounds on the carbon mineralization efficiency of the GGBS, and a value range is 0.843-0.951; ms is the mass of the GGBS; $m_{CaO}$ is a total mass of calcium oxide in the mixture of GGBS and silicon-aluminum compounds; and $m_{MgO}$ is a total mass of magnesium oxide in the mixture of GGBS and silicon-aluminum compounds.

A ratio of the mass of distilled water added in step (1) to a total mass of GGBS and silicon-aluminum compounds is 0.1:1.

In step (4), a median size of the mixture of GGBS and silicon-aluminum compounds is required to be 8.8-9.2 micrometers. When the particle size of the carbonate is greater than that of the GGBS mixture, the hydration products per unit volume of the slag concrete are reduced, which shows a diluting effect, and may reduce the mechanical properties and durability of the slag concrete. According to the present disclosure, during the ball milling, by controlling the milling speed, the pressure, the temperature and the time, the fineness of the carbonate generated by carbonation is in a nanoscale, and the carbonate with the particle size greater than that of the GGBS mixture may not be generated, which may not produce an adverse effect on the particle size distribution of the GGBS mixture and the properties of the slag concrete.

Embodiment 3

A method for preparing concrete based on GGBS, silicon-aluminum compounds and $CO_2$ waste gas is disclosed. As described in Embodiment 2, in the present disclosure, by controlling parameters such as the amount of the silicon-aluminum compounds, pressure during ball milling, time, temperature, etc., a mass ratio of the reacted $CO_2$ to the adsorbed $CO_2$ is about 4.0 to 2.5, so that the carbonate generated by milling and the adsorbed $CO_2$ can play an optimal activation role in the hydration of the GGBS and cement.

Embodiment 4

A method for preparing concrete based on GGBS, silicon-aluminum compounds and $CO_2$ waste gas is disclosed. As described in Embodiment 3, a total mass of $CO_2$ during the ball milling is related to a content of calcium and magnesium oxides in the GGBS and a porosity of the silicon-aluminum compounds. When excessive $CO_2$ waste gas is introduced, carbonation of the GGBS mixture may generate excessive carbonates, so that an average pore size of the GGBS mixture is reduced, the capacity of the GGBS mixture for adsorbing $CO_2$ is weakened, and the hydration activity of the GGBS and the freezing resistance of the prepared slag concrete are reduced. By controlling the total mass of the introduced $CO_2$, the carbonation reaction is ensured to generate a proper amount of carbonate, and the total mass $m_{CO_2}$ of $CO_2$ required to be reacted and adsorbed by the mixture of GGBS and silicon-aluminum compounds is as follows:

$$m_{CO_2} = \left(\frac{m_{CaO}}{M_{CaO}} + \frac{m_{MgO}}{M_{MgO}}\right) \times M_{CO_2} \times \mu \times \left(1 + \frac{m_{SA}}{m_{SA} + m_S}\right) \times \delta,$$

in the formula, $M_{CaO}$, $M_{MgO}$ and $M_{CO_2}$ represent molar masses of calcium oxide, magnesium oxide and carbon dioxide, respectively; μ is an empirical coefficient inferred according to the activity of alkaline-earth metallic oxides in the material, and a value range is 0.45-0.65; and δ is a coefficient related to the porosity of the added silicon-aluminum compounds, and a value range is 1.1-1.4.

The $CO_2$ waste gas includes one or more of $CO_2$-containing industrial waste gases emitted from coal-fired power plants, or a combination of, and iron and steel production, and according to the total mass $m_{CO_2}$ of $CO_2$ required to be reacted and adsorbed by the mixture of GGBS and silicon-aluminum compounds, a required mass M of the waste gas introduced into the tank is calculated by the following formula:

$$m_{CO_2} = \frac{xN}{1.112} + 0.718(M - x),$$

$$M = \sum m_n K_n,$$

in the formula, x is the mass of industrial waste gas with the highest $CO_2$ content in the $CO_2$ waste gas; N indicates a proportion of $CO_2$ in the industrial waste gas with the highest $CO_2$ content the $CO_2$ waste gas; xN/1.112 indicates the mass of $CO_2$ in the industrial waste gas with the highest $CO_2$ content in the $CO_2$ waste gas; 1.112 is an empirical coefficient inferred according to the $CO_2$ content in the industrial waste gas with the highest $CO_2$ content in the $CO_2$ waste gas; M is the mass of the waste gas introduced into the tank and also the total mass of all industrial waste gases in the $CO_2$ waste gas; and 0.718 (M−χ) is a sum of $CO_2$ content of other industrial waste gases in the $CO_2$ waste gas, and 0.718 is an empirical coefficient inferred according to the proportion sum of the $CO_2$ content of other industrial waste gases in the $CO_2$ waste gas; $m_n$ is the separate mass of each industrial waste gas, and $K_n$ is a proportion of $CO_2$ in each industrial waste gas.

Since the $CO_2$ waste gas contains various industrial waste gases, and the $CO_2$ content in different types of industrial waste gases is different, the utilization efficiency in carbon mineralization is also different, and a required mass of various industrial waste gases may be determined by the above formula.

Due to different sources of the $CO_2$ waste gas, the proportion of each component in chemical compositions is sometimes quite different, and the components are complex. The empirical coefficient has a correction effect, which improves the applicability of the formula to various types of $CO_2$ waste gases.

The empirical coefficients 1.112 and 0.718 are obtained through fitting based on the data of $CO_2$ in multiple groups of industrial waste gases using software, which are representative because the empirical coefficients are obtained from extensive data analysis.

Preferably, the milled GGBS mixture contains carbonates and $CO_2$ adsorbed in the pores, and in the hydration process after the GGBS mixture is mixed with the cement, excessive carbonates and $CO_2$ may not improve the hydration activity of the GGBS and cement. In order to achieve the optimal activation and hydration effect of the carbonized GGBS mixture, in step (5), the amount of Portland cement is determined according to the mass of the mixture of GGBS and silicon-aluminum compounds:

$$m_c = \frac{m_{CO_2}}{M_{CO_2}} \times M_C \times 0.8 \times \gamma,$$

in the formula, mc is a required mass of Portland cement; Mc indicates a molar mass of the carbonate generated by carbon mineralization; 0.8 is a ratio of the mass of $CO_2$ for carbon mineralization in the GGBS mixture to the total mass of $CO_2$; and γ is a parameter related to the efficiency of the carbonate for activating the cement and is valued at 2.72-4.27.

Embodiment 5

A method for preparing concrete based on GGBS, silicon-aluminum compounds and $CO_2$ waste gas is disclosed. As described in Embodiment 5, the silicon-aluminum compounds are metakaolin, and mass parts of the GGBS, the metakaolin and the distilled water are 27, 3, and 3, respectively; and the mass part of aluminum oxide in the ball milling tank is 50; and When the slag concrete is prepared after the ball milling, 35 parts of Portland cement, 23 parts of water, 99 parts of fine aggregate natural sand, and 147 parts of coarse aggregate granite are used.

GGBS components include 38.47-41.78 wt % of CaO, 35.29-38.53 wt % of $SiO_2$, 6.57-11.85 wt % of MgO, 8.17-11.41 wt % of $Al_2O_3$, 0.20-0.67 wt % of $Fe_2O_3$, 0.18-0.56 wt % of $K_2O$, and 0.45-3.74 wt % of others.

Metakaolin components include 43.84-49.7 wt % of $SiO_2$, 27.58-32.45 wt % of $Al_2O_3$, 7.25-9.78 wt % of $K_2O$, 0.74-2.02 wt % of $Fe_2O_3$, and 7.29-15.47 wt % of others.

Fly ash components include 3.97-8.63 wt % of CaO, 45.20-48.34 wt % of $SiO_2$, 23.71-31.10 wt % of $Al_2O_3$, 2.57-3.97 wt % of $Na_2O$, 0.47-3.17 wt % of MgO, and 4.45-24.42 wt % of others.

Embodiment 6

A method for preparing concrete based on GGBS, silicon-aluminum compounds and $CO_2$ waste gas is disclosed. As described in Embodiment 6, the silicon-aluminum compounds are fly ash, and mass parts of the GGBS, the fly ash and the distilled water are 29, 18 and 4.7, respectively; and the mass part of aluminum oxide in the ball milling tank is 50.

When the slag concrete is prepared after the ball milling, 39 parts of Portland cement, 31 parts of water, 140 parts of fine aggregate natural sand, and 200 parts of coarse aggregate granite are used.

Embodiment 7

A method for preparing concrete based on GGBS, silicon-aluminum compounds and $CO_2$ waste gas is disclosed. As described in Embodiment 6, the silicon-aluminum compounds are metakaolin and fly ash, a ratio of metakaolin to fly ash is 1:1, and mass parts of the GGBS, the silicon-aluminum compounds and the distilled water are 31, 5 and 3.6; and the mass part of aluminum oxide in the ball milling tank is 50.

When the slag concrete is prepared after the ball milling, 35 parts of Portland cement, 25 parts of water, 127 parts of fine aggregate natural sand, and 190 parts of coarse aggregate granite are used.

Embodiment 8

A method for preparing concrete based on GGBS, silicon-aluminum compounds and $CO_2$ waste gas is disclosed. As described in Embodiment 6, the untreated slag concrete without adding the silicon-aluminum compounds includes GGBS and Portland cement, mass parts of the GGBS, the Portland cement and the distilled water are 30, 35 and 26, the mass part of fine aggregate natural sand is 110, and the mass part of coarse aggregate granite is 160.

Compressive strength of the prepared concrete at 3d and 7d is tested according to GB-T 50081-2019 "Standard for Test Methods of Concrete Physical and Mechanical Properties". The test results are as shown in table 1.

TABLE 1

Compressive strength of slag concrete at 7 d and 28 d

| Embodiments: | Compressive strength at 7 d (MPa) | Compressive strength at 7 d (MPa) |
|---|---|---|
| Embodiment 5 | 45.74 | 55.51 |
| Embodiment 6 | 41.17 | 53.16 |
| Embodiment 7 | 42.28 | 54.35 |
| Embodiment 8 | 38.50 | 46.71 |

Compared with the untreated concrete with the GGBS in Embodiment 8, the compressive strength of the slag concrete at 7d and 28d prepared in the present disclosure is improved by about 11.9% and 16.3% on average.

The compressive strength of the prepared concrete is tested according to GB-T50081-2019 "Standard for Test Methods of Concrete Physical and Mechanical Properties". The mass of $CO_2$ finally sequestrated in the GGBS mixture is calculated by an acid digestion method. 10% nitric acid solution is used for acid digestion, and a process of the acid digestion method is generally as follows: firstly, a weight of an empty beaker with a glass stick is recorded, about 40 g of GGBS mixture is weighed and put into the beaker, 300 ml of 10% nitric acid solution is put into another beaker, and the weight is recorded. The weighed nitric acid solution is mixed with the GGBS mixture, and stirred for 10 min with the glass stick (until bubbles disappear), and the weight of the mixture in the beaker is recorded. A $CO_2$ sequestration rate is calculated by the following formula:

$$CO_2 = \frac{m_1 + m_2 - m_3}{m_1/(1 + w_f)} * 100,$$

in the formula, $m_1$ is the weight (about 40 g) of the weighed GGBS mixture; $m_2$ is the weight (about 300 g) of the nitric acid solution; $m_3$ is the weight of the mixture after being stirred continuously for 10 min; and we is a moisture content of the GGBS mixture. The sequestration rate is as shown in Table 2:

TABLE 2

$CO_2$ sequestration rate of slag concrete

| Embodiments: | Embodiment | Embodiment 6 | Embodiment 7 |
|---|---|---|---|
| Sequestration rate (%) | 32.61 | 30.28 | 29.15 |

It can be seen that the $CO_2$ sequestration rate in the present disclosure is relatively high, so that the industrial waste gas is utilized, and the concentration of $CO_2$ in the atmosphere is reduced, which helps to slow down the greenhouse effect.

The above descriptions are preferred embodiments of the present disclosure. It should be pointed out that various improvements and modifications may be made by those ordinary skilled in the art without departing from the principle of the present disclosure. These improvements and modifications should also be regarded as the protection scope of the present disclosure.

What is claimed is:

1. A method for preparing concrete based on GGBS, silicon-aluminum compounds and $CO_2$ waste gas, comprising the following steps:

(1) mixing the GGBS, the silicon-aluminum compounds and distilled water in a mixer, and putting into a ball milling tank with aluminum oxide as a ball milling medium;

(2) introducing, by using an inflator pump, $CO_2$ waste gas into the ball milling tank, and turning off the inflator pump when gas pressure in the tank reaches 190-210 kPa;

(3) starting a ball milling machine, milling at a speed of 400-600 rpm for 10 to 20 min, then standing still, repeating operations in step (2), then continuing the milling, and repeating the operations for multiple times until a specified mass M of $CO_2$ waste gas is introduced, filling the tank with nitrogen until the gas pressure in the tank reaches 190-210 kPa, and controlling, by using an air cooling machine, a temperature of the ball milling tank to be 20±2° C.;

wherein the specified mass M of $CO_2$ waste gas is $m_{CO_2}$, $$m_{CO_2} = \frac{xN}{1.112} + 0.718(M - x),$$

$$M = \sum m_n K_n,$$

in the formula, x is the mass of the industrial waste gas with the highest $CO_2$ content in the $CO_2$ waste gas; N indicates a proportion of $CO_2$ in the industrial waste gas with the highest $CO_2$ content in the $CO_2$ waste gas; $\chi N/1.112$ indicates the mass of $CO_2$ in the industrial waste gas with the highest $CO_2$ content in the $CO_2$ waste gas; M is the mass of the waste gas introduced into the tank, and is also the total mass of all industrial waste gases in the $CO_2$ waste gas; and $0.718(M-\chi)$ is a sum of $CO_2$ content of other industrial waste gases in the $CO_2$ waste gas, $m_n$ is the separate mass of each industrial waste gas, and $K_n$ is a proportion of $CO_2$ in each industrial waste gas;

(4) measuring a median size of a mixture of GGBS and silicon-aluminum compounds, and if the median size is larger than 9.2 micrometers, continuing the ball milling in nitrogen until the median size is obtained as 8.8-9.2 micrometers;

(5) mixing the mixture of GGBS and silicon-aluminum compounds obtained in step (4) with Portland cement to obtain a GGBS-cement mixture, adding water according to a mass ratio of water to GGBS-cement mixture of (0.35-0.41): 1, and mixing with a coarse and fine aggregate to obtain a slag concrete; and (6) pouring the slag concrete obtained in step (5) into a mold, vibrating to compact, then sealing the mold, curing for 24 h at a temperature of 22±2° C. and a relative humidity greater than or equal to 90%, and demoulding;

wherein in step (1), when the mass of GGBS is known, the mass of silicon-aluminum compounds added into the ball milling tank is calculated according to the following formula:

$$m_{SA} = \frac{SSA_{SA}}{SSA_S} \times \omega \times (m_S - m_{CaO} - m_{MgO}),$$

in the formula, $m_{SA}$ is the mass of silicon-aluminum compounds; $SSA_{SA}$ and $SSA_S$ are specific surface areas of the silicon-aluminum compounds and the GGBS, respectively; a value range of ω is $0.843\text{-}_{0.951}$; $m_S$ is the mass of GGBS; $m_{CaO}$ is a total mass of calcium oxide in the mixture of GGBS and silicon-aluminum compounds; and $m_{MgO}$ is a total mass of magnesium oxide in the mixture of GGBS and silicon-aluminum compounds.

2. The method according to claim 1, wherein a ratio of the mass of distilled water added in step (1) to a total mass of the GGBS and the silicon-aluminum compounds is 0.1:1.

3. The method according to claim 2, wherein the silicon-aluminum compounds are construction materials containing $SiO_2$ and $Al_2O_3$, and comprise but are not limited to metakaolin, fly ash and a mixture of the two.

4. The method according to claim 3, wherein in step (3), the ball milling machine mills at a speed of 500 rpm for 15 min, and then stands still for 10 min.

5. The method according to claim 4, wherein a total mass $m_{CO_2}$ of $CO_2$ required to be reacted and adsorbed by the mixture of GGBS and silicon-aluminum compounds is:

$$m_{CO_2} = \left(\frac{m_{CaO}}{M_{CaO}} + \frac{m_{MgO}}{M_{MgO}}\right) \times M_{CO_2} \times \mu \times \left(1 + \frac{m_{SA}}{m_{SA} + m_S}\right) \times \delta$$

in the formula, $M_{CaO}$, $M_{MgO}$ and $M_{CO_2}$ represent molar masses of calcium oxide, magnesium oxide and carbon dioxide, respectively; a value range of μ is 0.45-0.65; and a value range of δ is 1.1-1.4;

the $CO_2$ waste gas comprises one or more of $CO_2$-containing industrial waste gases emitted from coal-fired power plants, and iron and steel production, or a combination thereof, and according to the total mass $m_{CO_2}$ of $CO_2$ required to be reacted and adsorbed by the mixture of GGBS and silicon-aluminum compounds $$m_{CO_2} = \frac{xN}{1.112} + 0.718(M - x)$$

$$M = \sum m_n K_n.$$

6. The method according to claim 5, wherein in step (5), the amount of Portland cement is determined according to the mass of the mixture of GGBS and silicon-aluminum compounds:

$$m_c = \frac{m_{CO_2}}{M_{CO_2}} \times M_C \times 0.8 \times \gamma,$$

in the formula, $m_c$ is the required mass of Portland cement; $M_C$ indicates a molar mass of carbonates generated in carbon mineralization; and a value of γ is 2.72-4.27.

7. The method according to claim 6, wherein the silicon-aluminum compounds are metakaolin, and mass parts of GGBS, metakaolin and distilled water are 27, 3 and 3, respectively; and the mass part of the aluminum oxide in the ball milling tank is 50; and when the slag concrete is prepared after the ball milling, 35 parts of Portland cement, 23 parts of water, 99 parts of fine aggregate natural sand, and 147 parts of coarse aggregate granite are used.

* * * * *